(12) United States Patent
Wiegel et al.

(10) Patent No.: US 7,098,553 B2
(45) Date of Patent: Aug. 29, 2006

(54) TRAFFIC-DRIVEN WIND GENERATOR

(76) Inventors: Theodore F Wiegel, P.O. Box 1731, Goldenrod, FL (US) 32733; Kenneth C Stevens, 9308 Georgetown Pike, Great Falls, VA (US) 22066

(*) Notice: Subject to any disclaimer, the term of this patent is extended or adjusted under 35 U.S.C. 154(b) by 0 days.

(21) Appl. No.: 10/905,602

(22) Filed: Jan. 12, 2005

(65) Prior Publication Data

US 2006/0152012 A1    Jul. 13, 2006

(51) Int. Cl.
F03D 9/00    (2006.01)
H02P 9/04    (2006.01)

(52) U.S. Cl. .......................................... 290/55; 290/44

(58) Field of Classification Search ................. 290/44, 290/43, 54, 55; 415/4.3, 4.2, 2.1, 7, 907; 416/7, 11, 1
See application file for complete search history.

(56) References Cited

U.S. PATENT DOCUMENTS

| | | | | |
|---|---|---|---|---|
| 1,766,765 A | | 6/1930 | Savonius | ................ 416/132 R |
| 4,039,848 A | * | 8/1977 | Winderl | ....................... 290/55 |
| 4,321,476 A | * | 3/1982 | Buels | ........................... 290/55 |
| 4,784,568 A | | 11/1988 | Benesh | ........................... 415/3 |
| 4,890,976 A | | 1/1990 | Jansson | ...................... 415/4.4 |
| 4,926,061 A | | 5/1990 | Arreola, Jr. | ................... 290/55 |
| 5,137,416 A | * | 8/1992 | Mohrman | ................... 415/2.1 |
| 5,272,378 A | * | 12/1993 | Wither | ....................... 290/1 R |
| 5,280,827 A | * | 1/1994 | Taylor et al. | ................ 180/165 |
| 5,287,004 A | * | 2/1994 | Finley | .......................... 290/55 |
| 6,127,739 A | * | 10/2000 | Appa | ........................... 290/55 |
| 6,246,125 B1 | * | 6/2001 | Axtell | ........................ 290/1 A |
| 6,409,467 B1 | * | 6/2002 | Gutterman | .................. 415/4.3 |
| 6,590,363 B1 | | 7/2003 | Teramoto | .................... 320/101 |
| 6,740,988 B1 | * | 5/2004 | Tseng | .......................... 290/44 |
| 6,809,432 B1 | * | 10/2004 | Bilgen | .......................... 290/55 |
| 6,857,492 B1 | * | 2/2005 | Liskey et al. | ............... 180/165 |
| 6,882,059 B1 | * | 4/2005 | DePaoli | ....................... 290/44 |
| 6,923,615 B1 | * | 8/2005 | Crinion | ...................... 415/4.1 |

FOREIGN PATENT DOCUMENTS

| | | | |
|---|---|---|---|
| DE | 4232186 | | 4/1993 |
| JP | 04321774 A | * | 11/1992 |
| JP | 404350369 A | * | 12/1992 |

* cited by examiner

*Primary Examiner*—Julio C. Gonzalez
(74) *Attorney, Agent, or Firm*—Lacasse & Associates, LLC; Randy W. Lacasse; Jaclyn A. Schade

(57) ABSTRACT

A wind-capturing electrical generator device comprising a plurality of generators is driven by wind created by traffic passing in close proximity at high speeds. The device preferably uses horizontally or vertically mounted Savonius-type or helical-turbine-type rotors attached to electrical generators in order to capture the wind and produce electrical energy. A plurality of electrical generator devices may be mounted in a configuration such that they are in close proximity to vehicular passageways (e.g., highway overpasses, tunnels, or train rails). The wind created by the traffic is used to rotate the vanes and their attached generators in order to produce electrical energy.

14 Claims, 3 Drawing Sheets

TRAFFIC-DRIVEN WIND GENERATOR

BACKGROUND OF THE INVENTION

The present invention relates generally to the field of alternative energy production. More specifically, the present invention is related to wind-driven electrical generators.

One form of alternative energy production is wind generators, which are sometimes referred to as wind turbines. Wind generators may be categorized into two general types: those with a horizontal turning shaft—or on a horizontal axis—that point into the wind, or those with a vertical shaft—or on a vertical axis—that point vertically (or upward). Horizontal-axis generators are the most common kind of wind turbine. The blades or vanes provided on the horizontal-axis type are lifted aerodynamically as the wind blows into the device, causing the shaft to turn. Alternately, the vertical-axis type, such as a Savonius wind generator, generally comprises two vanes that catch the wind, thus causing the vertical shaft to turn. For example, see U.S. Pat. No. 1,766,765, which discloses a Savonius or vertical wind rotor with oppositely curved or arranged vanes. Additional examples of prior art wind generating devices or systems are provided below:

U.S. Pat. No. 4,784,568 provides a vertical axis Savonius rotor with a fantail that may be used with high-speed winds. The rotor is used with a single-speed control mechanism attached to the bottom of the rotor assembly.

U.S. Pat. No. 4,890,976 describes a wind-driven turbine including a rotor and a plurality of vanes that are vertically mounted for capturing wind and forming a venturi.

None of the above references describe a device that utilizes multiple electrical generators for the accumulation of wind energy. Each of the above types uses a single electrical rotor and stator for each device.

U.S. Pat. No. 4,926,061 is an example of prior art, discussing a windtrap energy system having a rotary shaft and a series of windtraps with vanes for capturing wind energy. The system may be in a vertical or horizontal position. Kinetic energy of wind is transmitted through the shaft and flywheel to turn multiple generators and produce electricity. An electrical controller is used with this system. However, it does not appear to describe its use in high-speed vehicular applications.

U.S. Pat. No. 6,590,363 B2 discloses a charging station comprising a duct that collects wind to generate power. The station uses solar panels and at least one Savonius-type wind power generator to charge an electric car. Using high-speed winds from passing vehicles, however, does not appear to be discussed.

German Patent DE 4232186 describes a wind generator placed by the side of a road or highway having 3-blades on a horizontal axis (as used on most wind farms). Preferably, the blades are set in motion by the draft of vehicles. However, because of the limited surface area it presents to vehicles, only a small fraction of the air output from vehicular traffic can be captured. Also, ducting is not practical, and the unshrouded design causes concern for safety.

One beneficial arena for energy production through the use of wind generators would be within an Interstate highway or other high-speed road system due to existing attachment points of overpasses. The average wind speed in the United States is approximately 12 mph; thus, large quantities of electricity may be produced due to the velocity of the winds produced by and around vehicles that greatly exceed this average speed. Similarly, other high-speed vehicles, such as trains, would also produce large quantities of wind energy in close proximity to the tracks. A system that effectively utilizes the hurricane-velocity winds available in high-wind speed environments such as these for energy production is greatly needed in the art. In particular, using two electrical generators for each device would double the traditional energy output.

The use of Savonius-type wind generators built to work with high-speed vehicles is not known in the art. Further, the use of Savonius-type wind generators designed for either horizontal or vertical mounting is not known in the art. Also, the use of more than one electrical generator in a given unit is not known or employed.

Using a Savonius-type wind generator driven by the high-speed buffeting (laminar flow) of vehicular traffic would be very beneficial. More specifically, mounting multiple Savonius-type generators horizontally and/or vertically to capture wind generated under highway overpasses and other high-wind transportation environments would provide a high-output, alternative energy production method.

SUMMARY OF THE INVENTION

A wind-capturing electrical generator device comprising a plurality of generators is driven by wind created by traffic passing at high speeds. The device uses horizontally or vertically mounted Savonius-type vanes to capture the wind and produce electrical energy. A plurality of electrical generator devices may be mounted in close proximity to vehicular passageways (e.g., highway overpasses, tunnels, or train rails).

DESCRIPTION OF THE PREFERRED EMBODIMENTS

Figure 1:
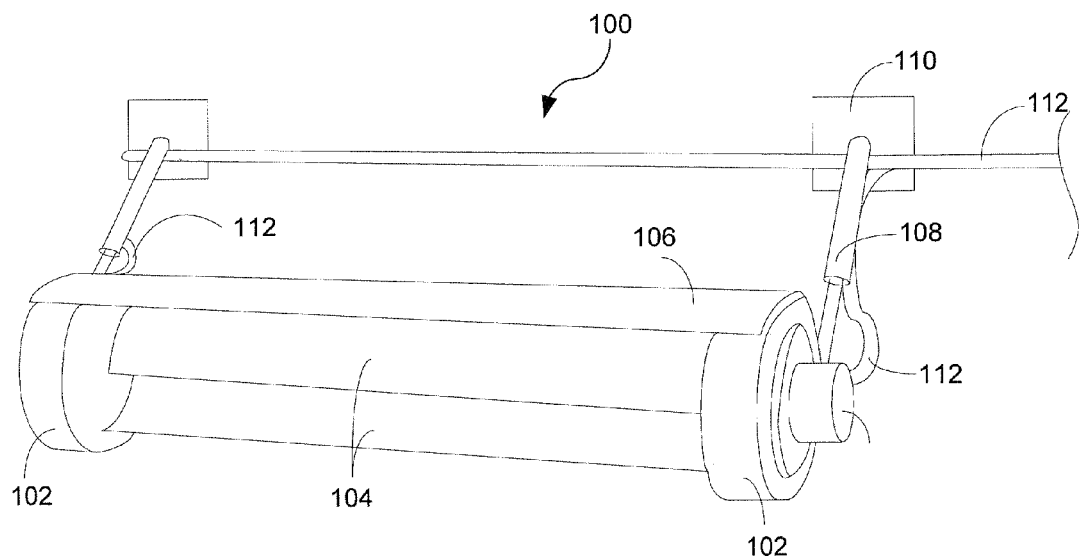
FIG. 1 illustrates a general wind-capturing electrical generator device.

While this invention is illustrated and described in a preferred embodiment, the device may be produced in many different configurations, forms and materials. Depicted in the drawings and herein described in detail is a preferred embodiment of the invention, with the understanding that the present disclosure is to be considered an exemplification of the principles of the invention and the associated functional specifications for its construction, and is not intended to limit the invention to the embodiment illustrated. Those skilled in the art will envision many other possible variations within the scope of the present invention.

FIG. 1 illustrates general wind-capturing device 100 used in the present invention. As shown, device 100 is preferably a horizontally-mounted Savonius-type wind generator. Device 100 comprises variable-speed electrical generators 102 and energy-capturing vanes 104 that are of the Savonius-type or helical-turbine type. Although two generators and vanes are shown and described, their number should not be limited. The vanes and electrical generators are operatively connected, such that rotation of the vanes subsequently rotates the generators. The electrical rotor (not shown) of each variable-speed electrical generator 102 captures residual motion of the wind to the maximum extent through flywheel effect, achieved partially through using light wind vanes with little inertia. It should be noted that in this application, "wind" refers primarily to artificially-generated airflow; that is, the wind or high-speed airflow created by vehicular traffic. Examples of the device's use will be described below.

Depending on the application, vanes 104 may turn in one or both directions. Also, vanes 104 can preferably withstand sudden wind bursts of more than 300 mph, and devices 100 can be sited in order to capture energy from natural prevailing winds as much as possible. Device 100 also comprises a removable safety shroud 106, adjustable mounting rods 108, a secure mounting 110, and electrical output lines 112. Adjustable mounting rods 108 allow device 100 to be raised and lowered to a desired height as well as a desired angle. The secure mounting 110 may be used to mount device 100 in a high-wind speed environment, such as underneath an Interstate highway overpass (as described below with reference to FIG. 2). Output lines 112 lead from generators 102 to a control box (not shown).

In addition, the present invention may be used with or without ducting (not shown). The use of ducting with device 100 will increase its efficiency. For example, with ducting the wind speed at vanes 104 will increase via a Venturi or funnel effect. Also, in conjunction with the force being directed to the bottom half of the vanes, it will substantially increase the amount of energy generated per vehicle.

Also, though FIG. 1 illustrates a single wind-capturing device 100, the preferred configuration is for a plurality of wind capturing devices used in a cluster, with each device comprising at least two electrical generators.

Figure 2:
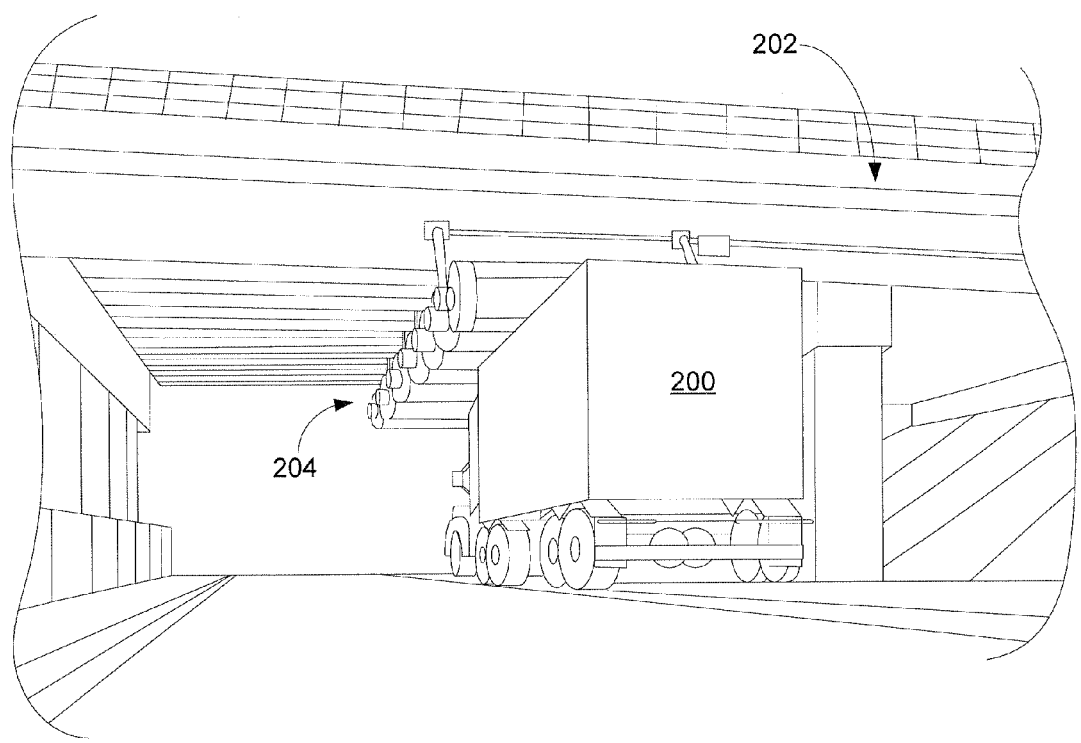
FIG. 2 illustrates the preferred configuration of a plurality of wind generator devices driven by close-proximity traffic in a highway system.

FIG. 2 illustrates the preferred configuration of wind-capturing electrical generator devices driven by close-proximity traffic in a highway system, such as an Interstate highway. A plurality of generators 204 is attached horizontally to an existing concrete structure of highway overpass 202. As described with reference to FIG. 1, generators 204 are adjustable for height as well as angle in order to safely clear vehicles that pass below and to interface most favorably with the airflow.

As vehicles, such as large trucks, tractor-trailers, or motor homes 200 drive underneath highway overpass 202, high-speed winds are created. The vanes in the plurality of generators 204 receive the airflow as the tractor trailer 200 passes.

In addition to the plurality of generators, other devices may be used to augment energy production. For example, the above highway system may also use ducting to increase efficiency.

Also, with proper height measurement (which is limited in the United States) and lane channeling (via the road department/U.S. DOT support), cars and SUVs may also be electrical energy producers. Given their vast numbers in relation to trucks, busses, and motor homes, it would be beneficial to alter the above-described system to include vehicles such as cars and SUVs as energy resources.

Figure 3A:
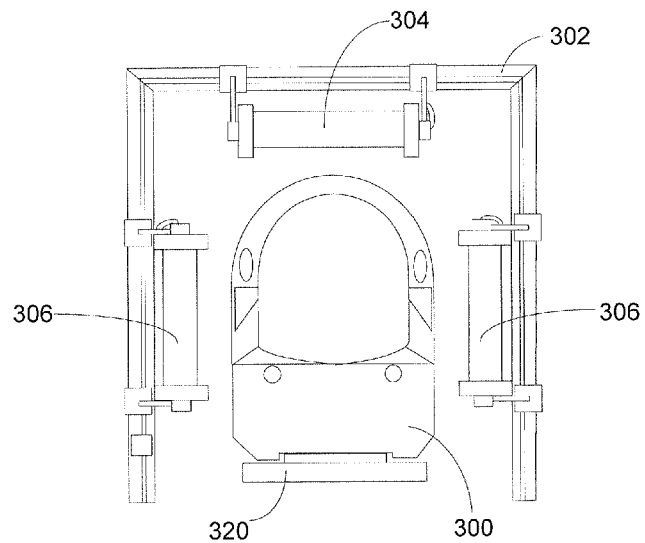
FIGS. 3a and 3b illustrate an alternative configuration of a plurality of wind generator devices driven by close-proximity traffic in a train system.
Figure 3B:
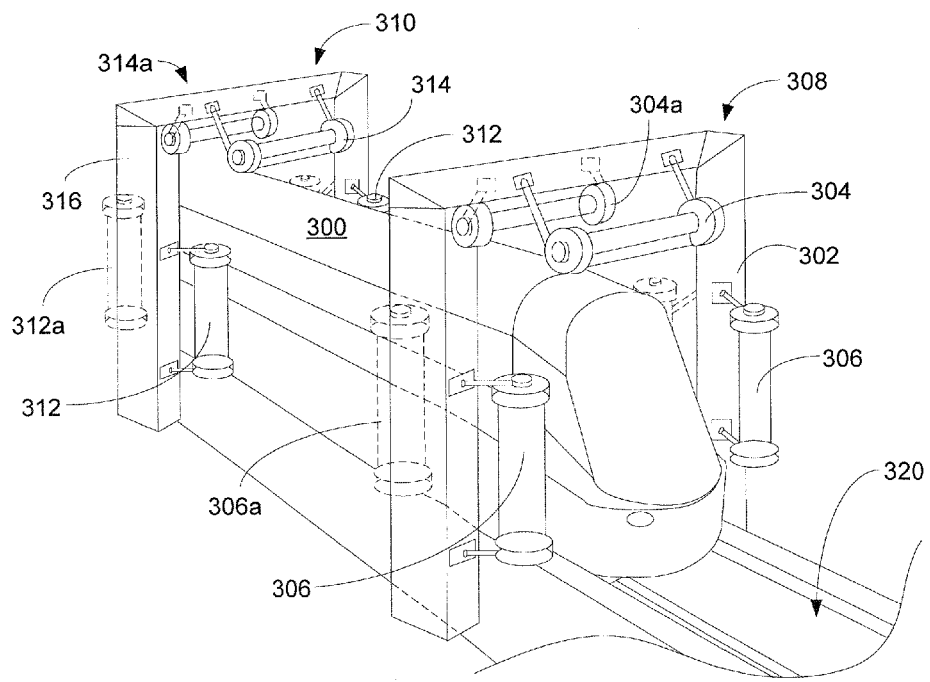

FIGS. 3a and 3b illustrate the use of the wind-capturing electrical generator devices in an alternative traffic-driven configuration. As shown in the figures, generator devices may be used in multiples with a train system, such as a high-speed train system, including "bullet" or MAGLEV trains, which provide a high-speed buffeting force.

FIG. 3a illustrates high-speed train 300. As shown, surrounding train 300 is a low-air-resistance mounting structure 302 with attached horizontal wind generator device 304 and two vertical wind generator devices 306 on either side. The low-air-resistance mounting structure, similar to those that are now used to mount Interstate system informational signs, should be of "open" construction so that extra drag (other than that imposed by passing vehicles) is not imposed on it (e.g., a structure like a wind tower). The mounting structure is designed to be large enough to allow a train to pass through. In this case, the mounting structure extends from one side of the track to the other, and allows for the attachment of generator devices on the top and sides to "surround" the train. However, designs that use structures just on top or sides do not depart from the scope of this invention. The mounting structure should be in close proximity to the train and the track in order to harness the most energy. Also, although three generator devices are illustrated, it should be noted that any number of generators may be used, and in a serial configuration. In addition, any combination of generators hung horizontally or vertically is also envisioned. An additional set of generator devices 304a and 306a is provided on the opposite sides of mounting structure 302, forming first generator cluster 308.

FIG. 3b illustrates a variant of the traffic-driven wind generator device with the previously described train system. Six generator devices (two horizontal, four vertical) are employed and are attached to a low-air-resistance mounting structure. In this configuration, a single structure comprises twelve electrical generators. In FIG. 3b, an additional or second generator cluster 310 is provided with horizontal generators 314 and 314a and vertical generators 312 and 312a on either side.

High-speed train 300 runs on track 320 and passes through a first and second generator cluster 308 and 310. The high-speed winds generated by the passing trains are captured by the Savonius-type vanes of the generator devices to generate electricity. Although only two clusters are shown, any number of clusters may be provided, and in a serial configuration. Also, although the low-air-resistance mounting structure is described with reference to a train system, the structures may also be applied to a highway system.

Also, it should be noted that the low-air-resistance mounting structure can span either auto-truck lanes or train rail lines, be cascaded in a series, with or without ducting, and capture energy from traffic going in one direction or both directions (conventionally trains go both directions on the same track, while other vehicles go in one direction on either side of the road).

The use of this wind generator with an electrically-driven train system has several advantages. For example, the energy produced by the device can help to propel the train with virtually no voltage drop due to proximity to the electrical source. Or, in the case of a train propelled by magnetic levitation (or MAGLEV train), the energy produced can supplement the energy used to lift the train. The wind generators would feed electrical energy directly to the track and the output lines would be very short; hence, minimal voltage drop. Also, the super high speeds of bullet and MAGLEV trains (which have the possibility of reaching over 300 mph) enable the generation of enormous amounts of wind energy as compared to road traffic. In a more regulated rail environment, the wind generator(s) can be positioned more closely to the moving vehicle, thereby enhancing efficiency.

A variation of the device described uses piezoelectric polymer coatings, cells, or wafers on both sides of each of its vanes such that when the vanes bend, extra electricity is generated. The bending amount is controlled through varying the thickness and composition of the vanes.

Some important advantages of the described traffic-driven wind generator device over traditional Savonius-type machines are: it is attached at two points instead of one, greatly enhancing its stability and durability in very high winds; the degree of blade flex and pitch can be better controlled between the two mounting surfaces; and the use of two electrical generators in one machine produces double the traditional energy output.

Electrical energy produced by the described device is "cleaned" and converted as required, metered, and sent directly into the local or regional electrical power grid. Local governments can be compensated via energy credits for the energy captured in their respective domains. Vehicles that pass the devices can be electronically registered and provided similar energy credits. In addition, the wind energy captured and converted to electrical energy on highways can be sent to designated rest stops where it can be used to recharge electric or hybrid vehicles.

The electrical generators used in the present invention may use magnetic bearings in lieu of traditional bearings, allowing them to be virtually free of maintenance, as shutting down traffic to lubricate bearings is inconvenient. Besides reducing maintenance, magnetic bearings also enhance efficiency. Also, some of the energy produced by the electrical generator can be siphoned off to power these bearings.

Other configurations, such as a single helical-vane unit or three or more vanes, rather than two vanes (a classic Savonius type) are also possible in the wind-capturing electrical generator device, and would not depart from the scope of the present invention.

Although the generator device is intended primarily to work with various vehicles or traffic, it could easily be adapted to a more conventional venue, such as the mouth of a valley or on a hilltop. Steady winds in these environments may exceed the average 12 mph, making it a highly desirable arena for capturing wind. Besides valleys or hills, the described device may also be placed on tall buildings (e.g., skyscrapers). In this case, its placement on tall buildings will capture high-velocity air, yet its low profile will be less objectionable than standard horizontal-shaft types because of its greater aesthetic appeal (and screens may be set up to preclude bird strikes). Also, the device may be sited underneath existing horizontal-type wind turbines in already-chartered wind farms. Placement in licensed wind farms will maximize the use of both the land and already-existing power grid hookups. In any of the above non-traffic-dependent cases, a platter or turntable may be used for mounting a base, and a tail vane (much like conventional wind generators) employed to enable the generator to turn into the wind. It may also be used with or without ducting in these non-vehicular applications.

CONCLUSION

A system and method has been shown in the above embodiments for the effective implementation of a traffic-driven wind generator. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques. As previously described, the generators in the present invention may use magnetic bearings in lieu of traditional bearings, and controlled bending of the vanes to derive electricity from piezoelectric cells or coatings. The number and configuration of vanes as described in the preferred embodiment should not be restricted.

What is claimed is:

1. A cluster of wind-capturing electrical generator devices harnessing wind to produce electrical energy, each wind-capturing electrical generator device comprising:
    at least two variable-speed generators,
    a plurality of wind-capturing vanes operatively connecting said variable-speed generators,
    at least two adjustable mounting rods attached at one end to said electrical generator device and at the other end to a secure mounting, and
    wherein said vanes driven by high-speed winds created by close-proximity traffic rotate said generators in said cluster to produce electrical energy.

2. A cluster of wind-capturing electrical generator devices as per claim 1, wherein said vanes of each wind-capturing electrical generator device comprise vanes of the Savonius or helical-turbine type.

3. A cluster of wind-capturing electrical generator devices as per claim 1, wherein said each wind-capturing electrical generator device is horizontally or vertically mounted.

4. A cluster of wind-capturing electrical generator devices as per claim 1, wherein said traffic includes those found on highways or train rails.

5. A cluster of wind-capturing electrical generator devices as per claim 1, wherein said adjustable mounting rods allow for height or angle adjustment.

6. A cluster of wind-capturing electrical generator devices as per claim 1, wherein each of said generator devices is mounted to a low-air resistance structure.

7. A cluster of wind-capturing electrical generator devices as per claim 1, wherein said vanes of each wind-capturing electrical generator device have a piezoelectric polymer coating or cells.

8. A cluster of wind-capturing electrical generator devices as per claim 1, wherein said generator device uses magnetic bearings.

9. A cluster of wind-capturing electrical generator devices as per claim 1, wherein said generator device is used with or without ducting.

10. A cluster of wind-capturing electrical generator devices as per claim 1, wherein each of said generator devices has a removable safety shroud.

11. A cluster of wind-capturing electrical generator devices as per claim 1, wherein said generator device is attached to an existing highway overpass.

12. A cluster of wind-capturing electrical generator devices as per claim 1, wherein said generator device surrounds a train-type vehicle.

13. A cluster of wind-capturing electrical generator devices as per claim 1, wherein said generator device is used on an existing wind farm.

14. A cluster of wind-capturing electrical generator devices as per claim 1, wherein said traffic includes vehicles, large trucks, tractor trailers, motor homes, high-speed trains, and magnetic levitation trains.

* * * * *